United States Patent
Tiberghien et al.

(10) Patent No.: US 9,939,096 B2
(45) Date of Patent: Apr. 10, 2018

(54) FEMALE ELEMENT AND COUPLING INTENDED TO FORM THE DISCONNECTABLE CONNECTION OF TWO FLUID PIPE LINES

(71) Applicant: STAUBLI FAVERGES, Faverges (FR)

(72) Inventors: Alain-Christophe Tiberghien, Sevrier (FR); Olivier Pastore, Ugine (FR)

(73) Assignee: STAUBLI FAVERGES, Faverges (FR)

( * ) Notice: Subject to any disclaimer, the term of this patent is extended or adjusted under 35 U.S.C. 154(b) by 53 days.

(21) Appl. No.: 14/197,554

(22) Filed: Mar. 5, 2014

(65) Prior Publication Data

US 2014/0265315 A1   Sep. 18, 2014

(30) Foreign Application Priority Data

Mar. 14, 2013 (FR) ...................... 13 52287

(51) Int. Cl.
  *F16L 37/42* (2006.01)
  *F16L 37/22* (2006.01)

(52) U.S. Cl.
  CPC ............... *F16L 37/42* (2013.01); *F16L 37/22* (2013.01)

(58) Field of Classification Search
  CPC ............ F16L 37/18; F16L 37/42; F16L 37/22
  USPC ........ 285/312, 308, 316, 317, 314, 315, 277
  See application file for complete search history.

(56) References Cited

U.S. PATENT DOCUMENTS

| | | | | |
|---|---|---|---|---|
| 3,195,935 | A | * 7/1965 | Beebee | F16L 37/22 137/614.03 |
| 3,558,160 | A | 1/1971 | Falkner | |
| 4,799,714 | A | * 1/1989 | Collet | 285/123.11 |
| 5,310,226 | A | * 5/1994 | Norkey | F16L 37/22 285/316 |
| 5,658,018 | A | * 8/1997 | Hjertholm | F16L 37/18 285/18 |
| 5,984,371 | A | 11/1999 | Mailleux | |
| 7,766,393 | B2 | * 8/2010 | Tiberghien et al. | 285/317 |
| 2011/0018258 | A1 | 1/2011 | Tiberghien et al. | |
| 2011/0298208 | A1 | 12/2011 | Covert | |

FOREIGN PATENT DOCUMENTS

| | | |
|---|---|---|
| DE | 202012104409 U1 | 11/2012 |
| EP | 2278205 A1 | 1/2011 |
| FR | 2740852 A1 | 5/1997 |

* cited by examiner

*Primary Examiner* — Gregory J Binda
*Assistant Examiner* — Zachary T Dragicevich (57) ABSTRACT

A female element of a coupling for the connection of two fluid pipe lines includes a body for receiving a male element and which defines a channel for the passage of fluid and which includes at least one locking element movable in rotation with respect to the body around a generally ortho-radial axis (X40 a-X'40 a), between a first angular position wherein the locking element locks the male element in a coupled configuration with the female element, and a second angular position wherein the locking element permits the male element to be separated from the female element and wherein the locking element has a first guide surface in a form of a portion of a cylinder with a circular section centered on an axis of the locking element and the locking element is arranged in a slot in the body of the female element and a second guide surface that rotates with the first guide surface.

16 Claims, 8 Drawing Sheets

FEMALE ELEMENT AND COUPLING INTENDED TO FORM THE DISCONNECTABLE CONNECTION OF TWO FLUID PIPE LINES

BACKGROUND OF INVENTION

Field of the Invention

This invention relates to a female element of a coupling intended to form the disconnectable connection of two fluid pipe lines under pressure, as well as such a coupling.

The invention relates more particularly to couplings intended for quickly connecting pipe lines through which pass fluids under very high pressure, in particular greater than 200 bar.

Brief Discussion of the Related Art

A coupling conventionally comprises a male element and a female element that are complementary, that are connected by fitting them into one another. The elements are each connected to a pipe line or to a reservoir. The first and/or the second element are generally provided with a cut-off valve which is maneuvered into an open position when the two elements are fitted. After this fitting, the two pipe lines are joined in a sealed manner and the fluid can flow from one to the other.

Conventionally, the female element comprises locking balls provided to be selectively engaged in an outer peripheral groove of the male element, in such a way as to provide for the locking of the male element in the female element. The zones of contact between the balls and the groove of the male element have a reduced surface area, in such a way that the repeated fitting of the male and female elements induces wear and tear or a localised caulking of the male element, which hinders the proper operation of the coupling. In particular, in applications such as the filling of tanks of motor vehicles with liquefied petroleum gas (LPG), the pressure of the fluid passing through the coupling can reach 250 bar, which generates substantial stress on the elements that the coupling is comprised of, in particular the locking balls, resulting in the decrease in the service life of the coupling. Moreover, the radial displacement of the balls between the unlocked position and the locked position increases the radial dimension of the female element.

EP-A-0 723 641 has for object a coupling comprising a female element including cavities distributed on the circumference of the female element and opening into the central passage of this element. Supports mounted in the housings comprise tips for the articulation in rotation of locking elements. The locking elements comprise a cylindrical blocking surface which, in the uncoupled configuration of the coupling, interacts with an exterior groove of the male element, which results in the wear and tear or caulking of the contact surfaces. This coupling comprises a large number of different parts which makes assembly long and delicate.

SUMMARY OF THE INVENTION

It is these disadvantages that the invention intends to overcome more particularly by proposing a quick coupling female element of which the radial dimension is limited, and having robust locking elements that reduce the risks of wear and tear or of caulking of the zones of contact with the male coupling element.

To this effect, the invention has for object a female element of a coupling for the disconnectable connection of two fluid pipe lines under pressure, extending longitudinally along an axis and comprising:

- a body able to receive through fitting a male element and defining a channel for the passage of the fluid that extends along the axis of the coupling,
- at least one locking element mobile in rotation with respect to the body of the female element around a generally orthoradial axis, between a first angular position wherein the locking element locks the male element in a coupled configuration, and a second angular position wherein the locking element authorises the withdrawal of the male element outside of the female element.

The locking element has a first guiding surface in the form of a portion of a cylinder with a circular section centred on an axis of the locking element. The locking element is arranged in a slot arranged in the body of the female element and delimited by a cylinder with circular section extending along the orthoradial axis and defining a second guiding surface in rotation of the first guiding surface of the locking element in the body of the female element around the orthoradial axis.

Thanks to the invention, the structure of the female element is simplified as the slot of the locking element can be obtained via simple machining, without requiring the addition of additional parts. In addition, the locking element can be of a single block. The guiding surfaces in rotation of the locking element are relatively extended, which improves the robustness of the female element.

According to advantageous but not mandatory aspects of the invention, such a coupling can incorporate one or several of the following technical characteristics, taken in all technically permissible combinations:

- The first guiding surface of the locking element extends over the entire length of the locking elements, measured according to an axis of the locking element that coincides with the orthoradial axis in mounted configuration of the locking element in the slot.
- The locking element has a locking surface in the form of a portion of a cone which is in contact with a peripheral groove of the male element in the coupled configuration.
- The female element comprises a locking ring mobile in translation along the axis of the coupling, between a first position wherein the locking ring constitutes an abutment in rotation of the locking element in the first angular position of the locking element, and a second position wherein the locking ring authorises the rotation of the locking element.
- The locking element has a blocking surface which is pressing against the locking ring in the first angular position of the locking element and which is a portion of a cylinder with circular section extending along the axis of the coupling.
- The locking surface and the blocking surface of the locking element are included in an imaginary cylindrical casing or envelope "C" defined by rotation of the first guiding surfaces.
- The locking ring is mobile in translation along the axis of the coupling, to a third position wherein the locking ring constitutes an abutment in rotation of the locking element in the second angular position of the locking element. The locking element has a support surface which is pressing against the locking ring in the second angular position of the locking element.
- The support surface of the locking element is included in an imaginary cylindrical casing or envelope "C" defined by rotation of the first guiding surfaces.
- The locking element is of a single block.

The slot of the locking element is formed by machining in the body.

The female element comprises two diametrically opposite locking elements, with respect to the axis of the coupling.

The invention further relates to a coupling for the disconnectable connection of two fluid pipe lines under pressure, comprising a male element and such a female element.

BRIEF DESCRIPTION OF THE DRAWINGS

The invention shall be well understood and other aspects of the latter shall appear more clearly in the following description of a coupling in accordance with the invention, provided solely by way of example and made in reference to the annexed drawings wherein.

DESCRIPTION OF THE PREFERRED EMBODIMENTS

The FIGS. 1 to 11 show a coupling 1 comprising a male element 2 and a female element 3. The female element 3 comprises a body 4, as well as a maneuvering ring 5 and a locking ring 6 mounted around the body 4 with possibility of relative movement. The maneuvering ring 5 is not shown in the FIGS. 1 and 2. When the elements 2 and 3 are fitted into one another, they extend along a longitudinal axis X-X'. The axis X-X' further constitutes an axis of revolution for the male element 2, the body 4 and the rings 5 and 6. The male element 2 is connected to a fluid pipe line C2, shown as mixed lines in FIG. 3, and the female element 3 is connected to a fluid pipe line C3, shown as mixed lines in FIGS. 3 and 4.

A surface is qualified as "internal" if it is turned towards the axis X-X', and as "external" if it is turned in the opposite direction. The adjective "proximal" designates an element of a part close to the pipe line C2 or C3 to which this part is connected, whereas the adjective "distal" designates an element that is further away from it.

The male element 2 is constituted of a main body formed of a proximal portion 22 connected to the pipe line C2 and of a distal portion 24. The male element 2 defines a longitudinal passage 20 through which a fluid can flow, for example liquefied petroleum gas (LPG). The distal portion 24 comprises a peripheral and external groove 26, of which the transversal section has a general V-shape with a flat bottom S262 of which the lateral branches are inclined towards the exterior and are defined by truncated proximal S264 and distal S266 surfaces. The distal portion 24 of the male element 2 in accordance with the embodiment exposed satisfies the standard ISO 17268 "Compressed hydrogen surface vehicle refueling connection devices".

The body 4 of the female element 3 comprises a proximal portion 42 and a distal portion 44. The body 4 delimits a channel 30 for the passage of the fluid and comprises a distal opening or mouth 49, with a shape complementary to the distal portion 24 of the male element 2, in such a way as to receive the male element 2. The passage 20, the outlet 49 and the channel 30 extend longitudinally along the axis X-X'.

The distal portion 24 of the male element 2 comprises an interior groove 28 wherein is received an O-ring 29 that guarantees the seal between the male element 2 and the female element 3 when the coupling 1 is in coupled configuration.

The distal portion 44 of the body 4 of the female element 3 houses a valve 43 that cuts off the channel 30 when the coupling 1 is in the uncoupled configuration. The valve 43 is pushed back by default towards the outlet 49 of the body 4, against its seat 48 in sealed position by means of a spring 13 forming an elastic member. In a manner known per se, the valve 43 comprises a longitudinal passage 431 which opens only on the side of the distal end 432. Opposite the distal end 432, the passage 431 communicates with two radial perpendicular holes 433. In the uncoupled configuration of the coupling 1, the holes 433 are located downstream of an O-ring 435 housed in an inner groove of the body 4 of the female element 3. Consequently, the fluid present in the channel 30 of the female element 3 cannot escape. In the coupled configuration of the coupling 1, the holes 433 are located upstream of the O-ring 435 and communicate as such with the channel 30 of the female element 3. Consequently, the fluid is free to flow between the female element 3 and the male element 2, by passing through the holes 433 and through the passage 431 of the valve 43.

Figure 4:
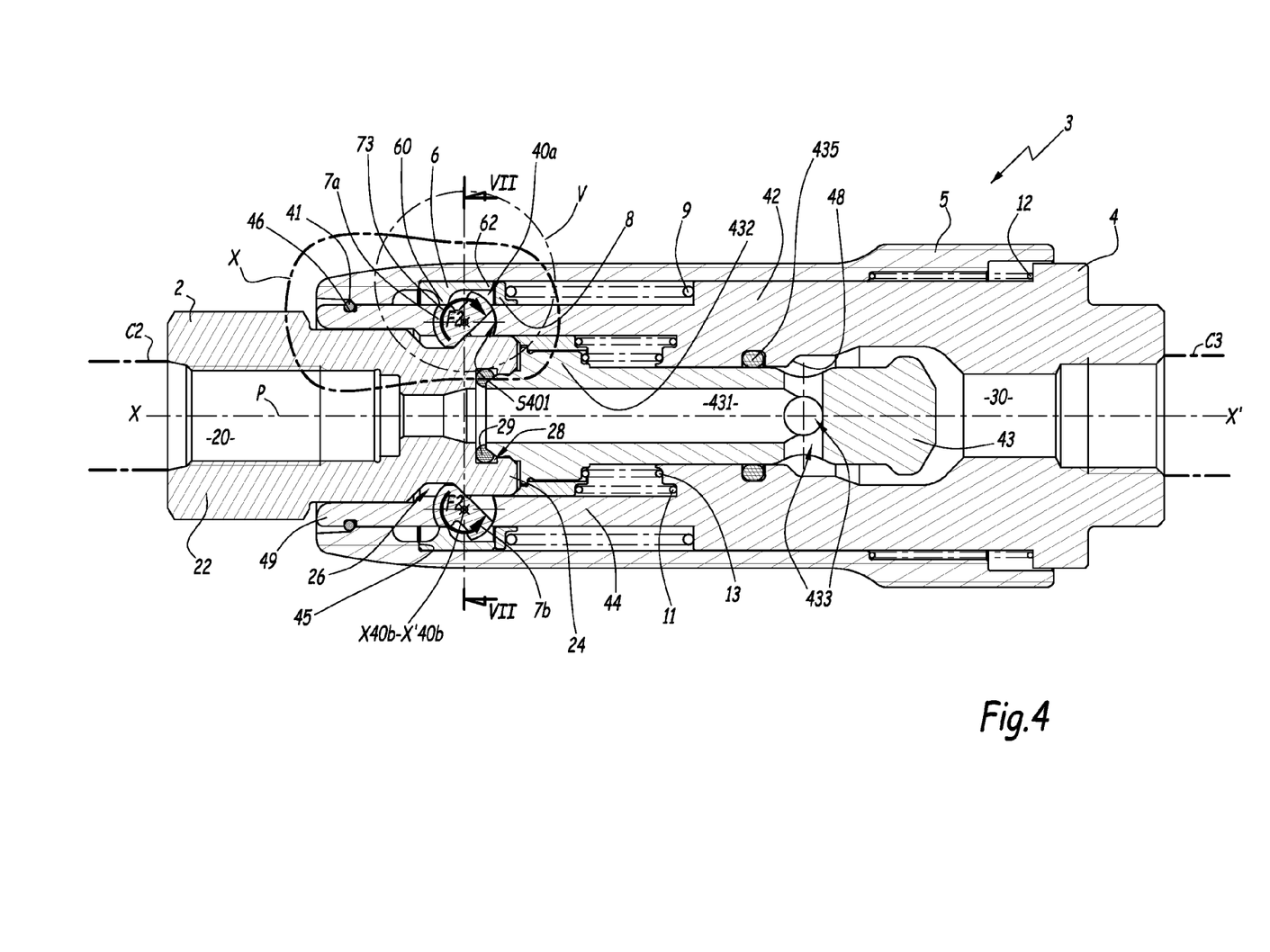
FIG. 4 is a longitudinal cross-section of the coupling of FIG. 1, in a coupled configuration.

In the coupled configuration of the coupling 1, shown in FIG. 4, the distal portion 24 of the male element 2 pushes back the valve 43 outside of its seat 48, against an elastic closing force exerted by the spring 13. The fluid under pressure, for example LPG at a pressure of 250 bar, can then flow from the upstream pipe line C3 to the downstream pipe line C2, through the channel 30 and the passage 20. The terms upstream and downstream refer to the direction of the flow of the fluid from the pipe line C3 to the pipe line C2. The other direction of flow can also be considered; the relative terms upstream and downstream are then inversed.

The maneuvering ring 5 of the female element 3 is pushed back by default towards the outlet 49, against an O-ring retainer 41, housed in a peripheral and outer groove 46 arranged on the outlet 49 of the body 4, by means of a spring 12. The maneuvering ring 5 makes it possible to control the disconnection of the elements 2 and 3.

The locking ring 6 is mobile in translation with respect to the body 4, along the axis X-X'. The locking ring 6 is of annular shape and comprises an inner rib or collar 60 of circular shape, which protrudes towards the axis X-X'. The collar 60 defines a cylindrical surface S60 of axis X-X'. The locking ring 6 contributes to locking the coupling 1 in the coupled configuration.

A support washer 8 is arranged against a proximal end 62 of the locking ring 6. A spring 9 is inserted between the body 4 and the washer 8 and pushes back by default the washer 8 and the locking ring 6 towards the outlet 49 of the female element 3.

The distal portion 44 of the body 4 of the female element 3 has a tubular shape which comprises two diametrically opposite holes 40a and 40b obtained via machining using a cutting tool rotating around an orthoradial axis, in other words circumferential or perpendicular to a radial direction with respect to the axis X-X'. The holes 40a and 40b each define a slot 401 which opens on either side of the body 4 in a radial direction with respect to the axis X-X', i.e. both in the channel 30 and on the side of the locking ring 6. The slots 401 are each delimited by a cylinder with circular section of axis X40a-X'40a or X40b-X'40b which as such defines a concave guiding surface S401e, referred to as second guiding surface, belonging to the body 4 and with the form of a portion of a cylinder with a circular section and of axis X40a-X'40a or X40b-X'40b. A first end of the slots 401 is closed by a wall 402 of the body 4. The second end of the slots 401 has an opening and communicates with a cut-out 403 parallel to the axis X-X'. Along the circumference of the body 4, the cut-outs 403 are turned towards each other, the same as the walls 402. The body 4 is symmetrical with respect to a longitudinal plane P passing through the axis X-X', between the holes 40a and 40b.

Figure 8:
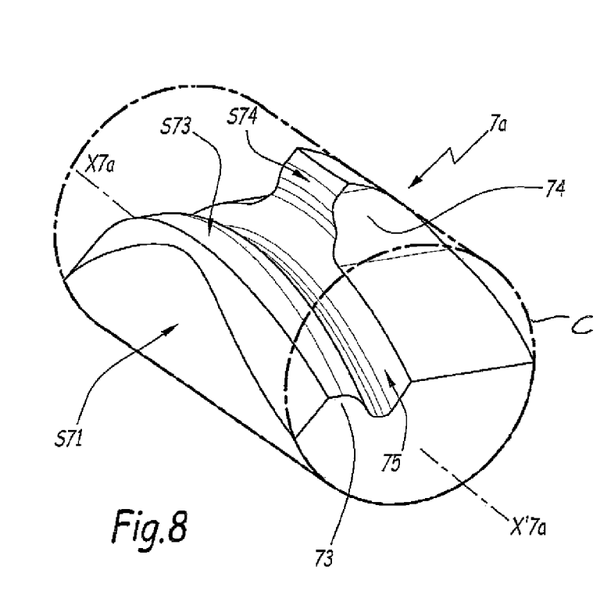
FIGS. 8 and 9 are views in perspective of a locking element that is part of the female element of the coupling of FIG. 1.
Figure 9:
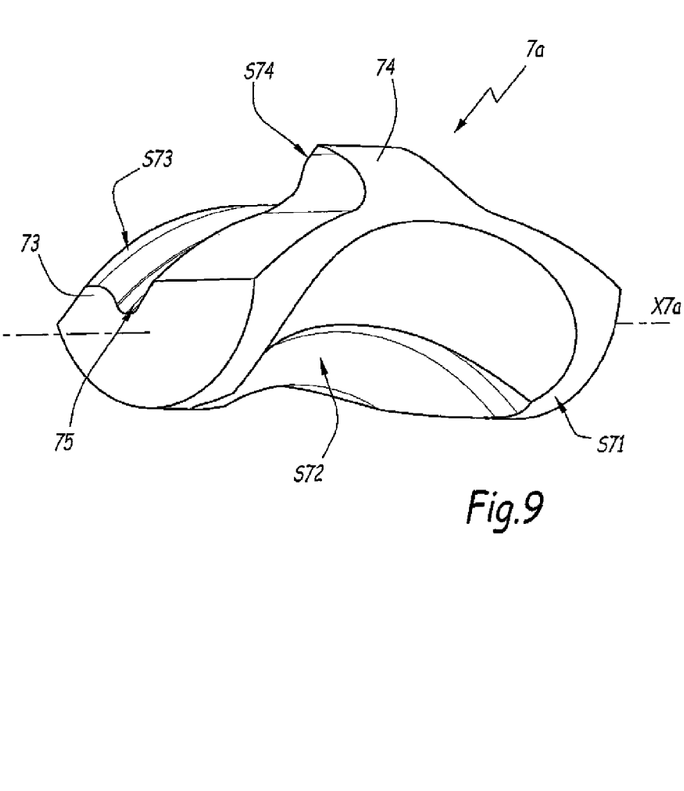

A locking element 7a or 7b is housed in the slot 401 of each hole 40a or 40b. The FIGS. 8 and 9 show the locking element 7a, knowing that the locking element 7b is identical. The locking elements 7a and 7b each comprise a guiding surface S71, referred to as first guiding surface, a locking surface S72 and a blocking surface S73.

The first guiding surface S71 of the locking elements 7a and 7b is generally in the form of a portion of a cylinder with a circular section of axis X7a-X'7a or X7b-X'7b having a geometry that is complementary to that of the second guiding surface S401 of the holes 40a and 40b.

The first guiding surface S71 of the locking elements 7a and 7b extends over the entire length of the locking elements 7a and 7b, measured along the axis X7a-X'7a or X7b-X'7b. The first guiding surface S71 of the locking elements 7a and 7b is in surface contact with the second guiding surface S401 of the holes 40a and 40b, in such a way that the axes X7a-X'7a and X40a-X'40a on the one hand, and X7b-X'7b and X40b-X'40b on the other hand, are confounded. The locking elements 7a and 7b are therefore mobile in rotation, around the axis X40a-X'40a or X40b-X'40b, with respect to the body 4. The axes X40a-X'40a and X40b-X'40b cut the distal portion 44 of the body 4, as such creating a condition for the guiding in rotation of the locking elements 7a and 7b. The diameter of the cylinder that defines the geometry of the first guiding surface S71 of the locking elements 7a and 7b is substantially equal, to the nearest functional clearances, to the diameter of the cylinder which defines the second guiding surface S401 of the female element 3, in such a way as to authorise the rotating movement of the locking elements 7a and 7b with respect to the body 4 of the female element 3.

The locking surface S72 of the locking elements 7a and 7b is in the form of a portion of cone of axis X-X' and is complementary to the truncated surface S266 of the groove 26 of the male element 2.

The blocking surface S73 of the locking elements 7a and 7b is in the form of a portion of cylinder of axis X-X'. The blocking surface S73 is complementary to the cylindrical surface S60 of the locking ring 6, i.e. of substantially equal diameter. The blocking surface S73 of the locking elements 7a and 7b is turned generally opposite the axis X-X', according to a radial direction. The blocking surface S73 forms the top of a shoulder 73.

Each locking element 7a and 7b comprises a primal tooth 74, protruding radially, opposite the axis X-X'. Each tooth 74 comprises a support surface S74 of which the normal is generally oriented according to an orthoradial direction with respect to the axis X7a-X'7a or X7b-X'7b.

Each locking element 7a and 7b comprises a peripheral outer groove 75 of axis X7a-X'7a or X7b-X'7b, which forms a clearance placed, according to a direction perpendicular to the axis X7a-X'7a or X7b-X'7b, between the shoulder 73 and the tooth 74.

The locking elements 7a and 7b are included in an imaginary cylindrical casing or envelope "C" defined by rotation of the first guiding surface S71. As such, the surfaces S72, S73 and S74 are included in this casing.

The mounting of the locking elements 7a and 7b in the holes 40a and 40b is carried out by inserting the locking elements 7a and 7b in the slots 401, on the side of the cut-outs 403, then by causing the locking elements 7a and 7b to slide in the slots 401, along the axis X40a-X'40a or X40b-X'40b, with their first guiding surface S71 in contact with the second guiding surface S401 of the slots 401, until they come to abut against the wall 402. The blocking in translation of the locking elements 7a and 7b, along axes X40a-X'40a and X40b-X'40b, is carried out in one direction by the walls 402 and in the other direction by stop elements 404a and 404b arranged in the cut-outs 403 and which can be seen in FIGS. 6 and 7.

The coupling 1 comprises a memory ring 10 arranged around a distal portion 432 of the valve 43 that comprises an outer collar 434. A spring 11 pushes back by default the memory ring 10 towards the outlet 49 of the body 4, against the collar 434 of the valve 43. The memory ring 10 makes it possible, in the uncoupled configuration of the coupling 1, to maintain the locking elements 7a and 7b in a position allowing the introduction of the male element 2.

In order to couple the elements 2 and 3, the coming closer together of the male element 2 and of the female element 3 is carried out by means of a translation of the female element 3 with respect to the male element 2, according to the axis X-X'. The operator acts indifferently on the female element 3 or on the male element 2 in order to couple the elements 2 and 3.

Figure 1:
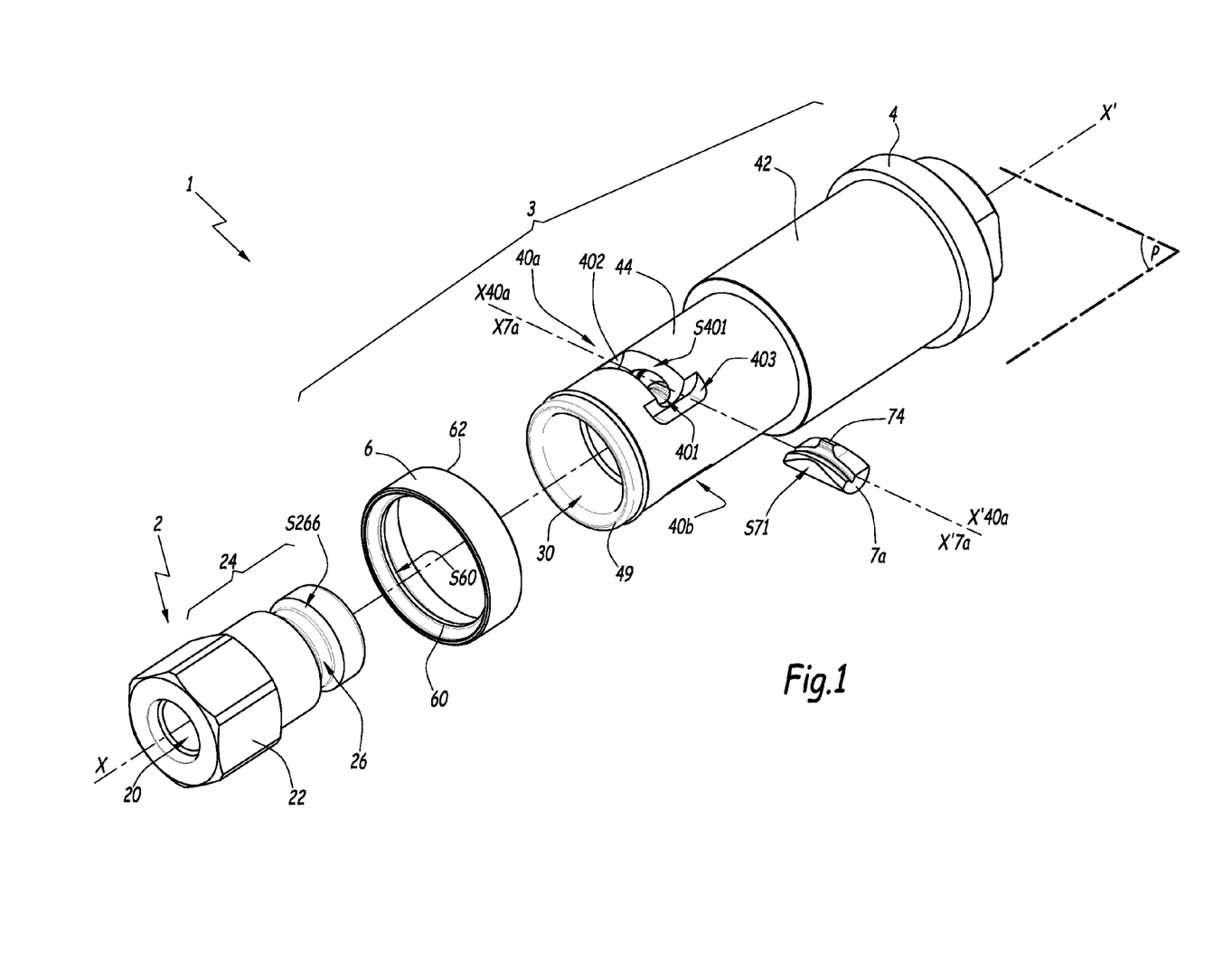
FIG. 1 is a perspective exploded view of a female element and a male element of a coupling in accordance with the invention, with a maneuvering ring of the female element not shown.
Figure 2:
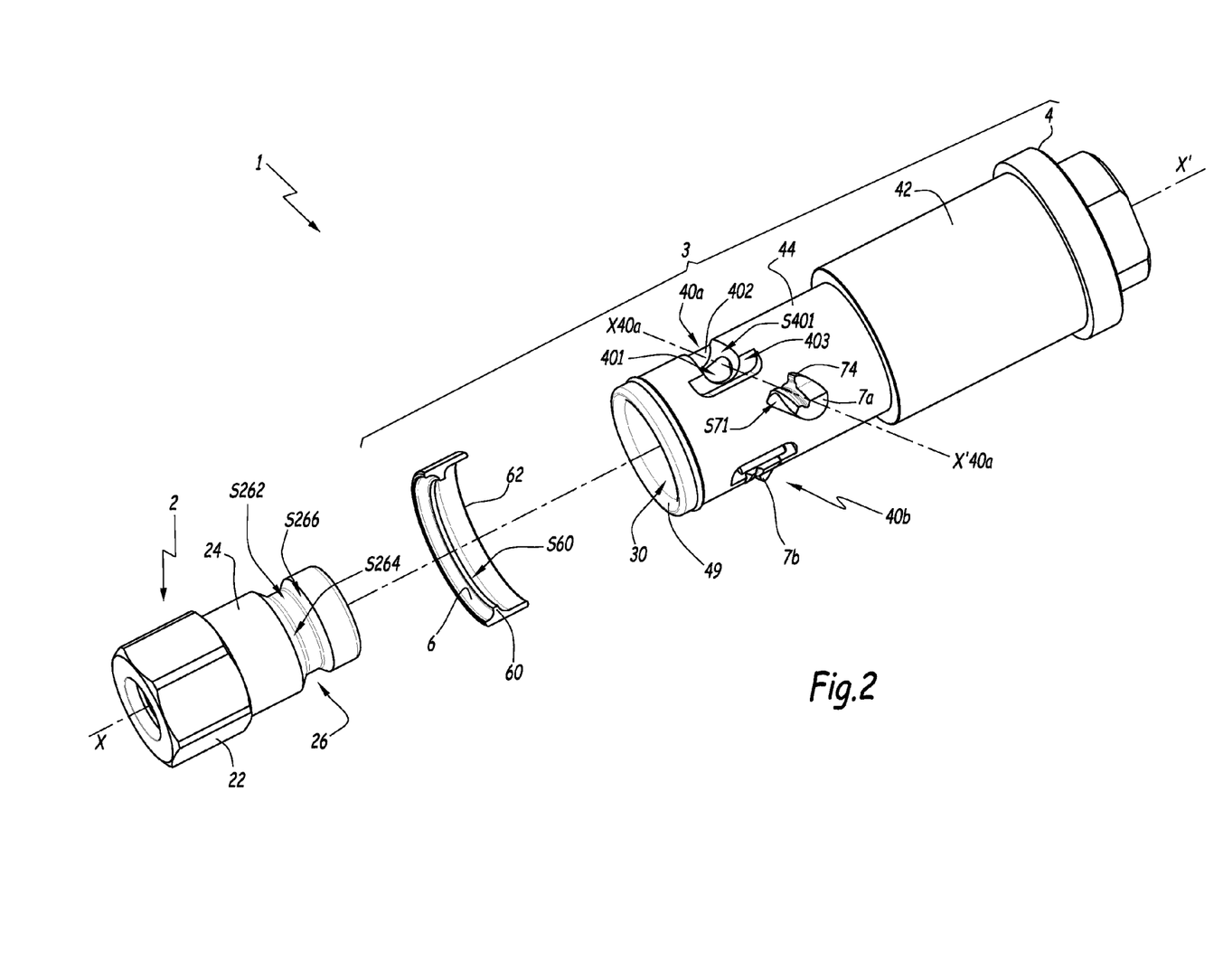
FIG. 2 is a perspective exploded view of the coupling of FIG. 1, under another angle, with the maneuvering ring of the female element not shown.
Figure 3:
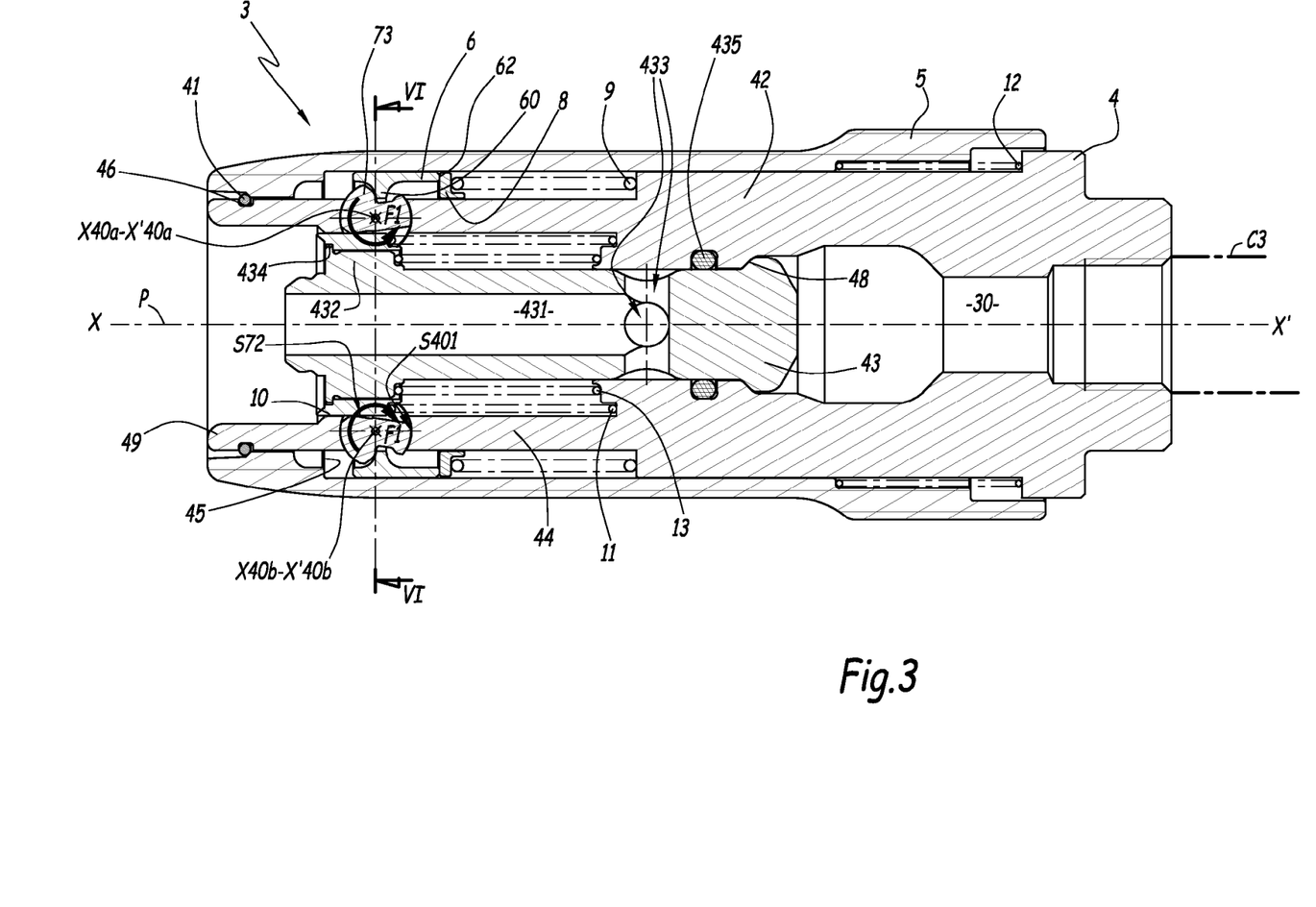
FIG. 3 is a longitudinal cross-section of the female element of the coupling of FIG. 1, in an uncoupled configuration.

Before the coupling, the female element 3 is in the uncoupled configuration shown in FIG. 3. In this configuration, the valve 43 is pushed back against its seat 48 by the spring 13 and the maneuvering ring 5 is pushed back by the spring 12 against the O-ring retainer 41. The memory ring 10 is pushed back against the collar 434 of the valve 43 by the spring 11. The washer 8 and the locking ring 6 are pushed back towards the outlet 49 by the spring 9. The collar 60 of the locking ring 6 is in a retraced axial position, in the groove 75 and abutting against the shoulders 73 of the locking elements 7a and 7b, applying a torque to the locking elements 7a and 7b, around axes X40a-X'40a and X40b-X'40b, in a first direction shown by the arrows F1 in FIG. 3.

The memory ring 10 is positioned against the locking surface S72 of the locking elements 7a and 7b and prevents the rotation, around axes X40a-X'40a or X40b-X'40b, of the locking elements 7a and 7b which are maintained in a fixed angular position.

At the start of the coupling of the coupling 1, the distal portion 22 of the male element 2 is introduced into the outlet 49. The male element 2 comes into contact with the distal portion 432 of the valve 43 and with the memory ring 10. It pushes them back against the retaining forces exerted by the springs 11 and 13, in such a way as to release the locking elements 7a and 7b from the engagement of the memory ring 10. The distal portion 22 of the male element 2 provides the blocking of the rotation of the locking elements 7a and 7b, according to the arrows F1, under the effect of the force exerted by the locking ring 6 against the shoulders 73, during the progression of the male element 2 in the channel 30 of the female element 3. The memory ring 10 is as such pushed back beyond the holes 40a and 40b wherein are housed the locking elements 7a and 7b.

When the groove 26 of the male element 2 arrives at the level of the locking elements 7a and 7b, the clearance formed by the groove 26 releases the rotation of the locking elements 7a and 7b, around axes X40a-X'40a and X40b-X'40b, in the holes 40a and 40b, according to the arrows F1, with respect to the body 4 of the female element 3. Consequently, the collar 60 of the locking ring 6 is no longer retained in the groove 75 of the locking elements 7a and 7b, and the retaining force exerted by the spring 9 displaces the washer 8 and the locking ring 6 in the direction of the outlet 49. At the same time, the collar 60 of the locking ring 6 presses against the shoulders 73 of the locking elements 7a and 7b, which causes the rotation of the locking elements 7a and 7b according to the arrows F1.

Figure 5:
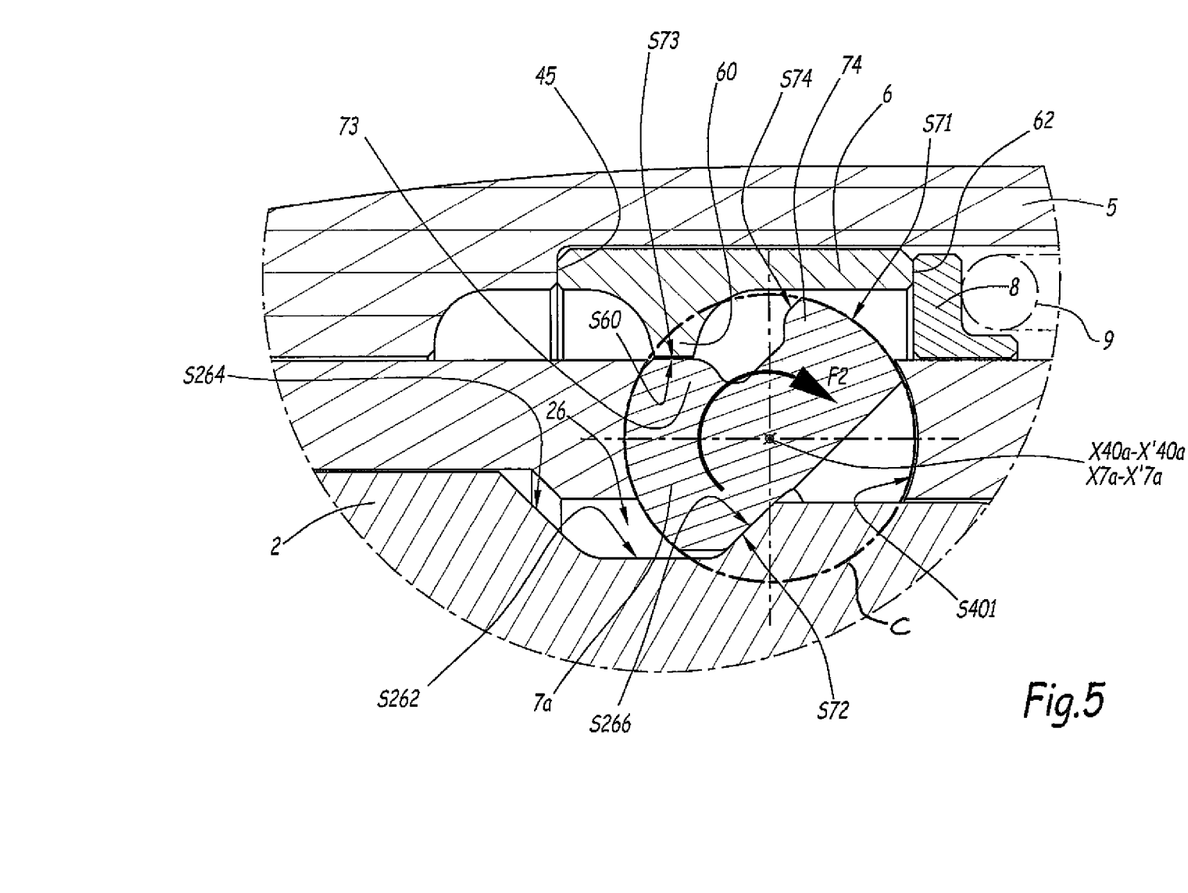
FIG. 5 is a view, on a larger scale, of the detail V in FIG. 4.
Figure 6:
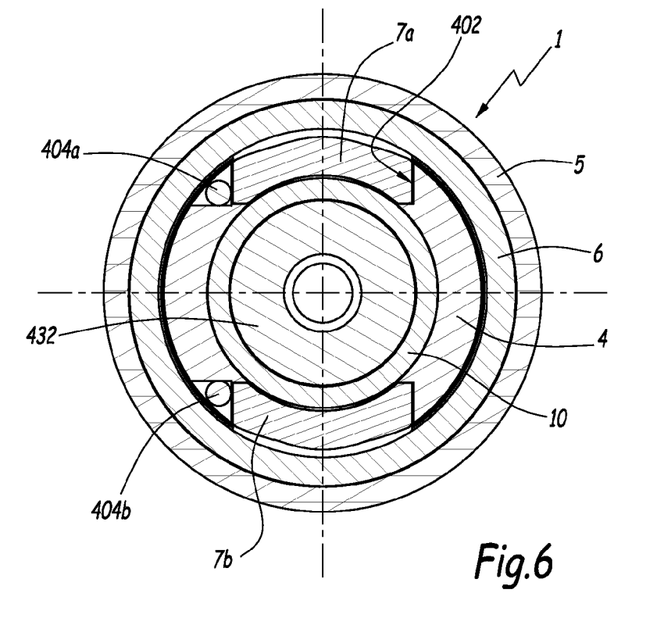
FIG. 6 is a transversal cross-section according to the plane VI-VI in FIG. 3.
Figure 7:
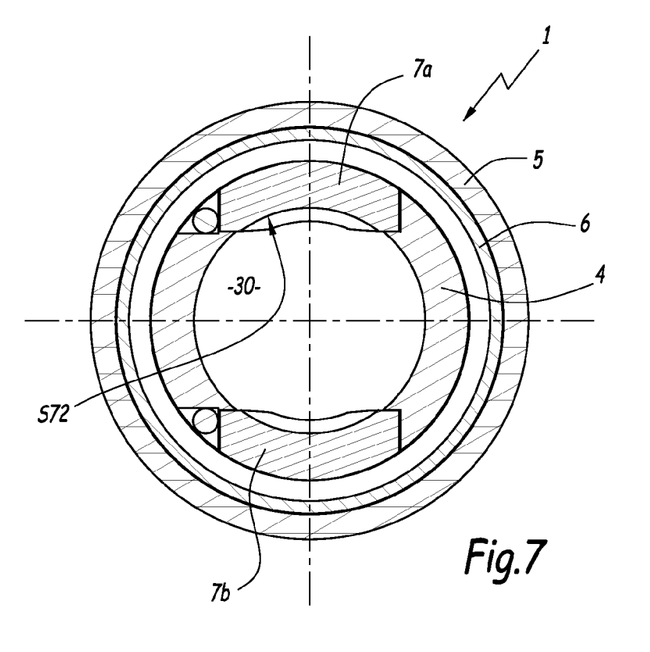
FIG. 7 is a transversal cross-section according to the plane VII-VII in FIG. 4.

The FIGS. 4 and 5 show the coupling 1 in coupled configuration. The locking ring 6 is in an advanced axial position, in contact against an inner shoulder 45 of the body 4. The cylindrical surface S60 of the locking ring 6 is in contact with the blocking surface S73 of the shoulders 73 of the locking elements 7a and 7b, which prevents the rotation of the locking elements 7a and 7b, around axes X40a-X'40a and X40b-X'40b, in a second direction, opposite the first direction F1 and shown by the arrows F2 in FIGS. 4 and 5. The locking surface S72 of the locking elements 7a and 7b is in contact with the truncated surface S266 of the groove 26 of the male element 2, in such a way that the locking elements 7a and 7b lock the male element 2 inside the female element 3. Indeed, the locking surfaces S72 block the withdrawal of the male element 2 outside of the female element 3.

In coupled configuration, the valve 43 is detached from its seat 48, which authorises the passage of the fluid between the elements 2 and 3, through the longitudinal passage 431 and the holes 433 of the valve 43, in the passage 20 and in the channel 30.

Figure 10:
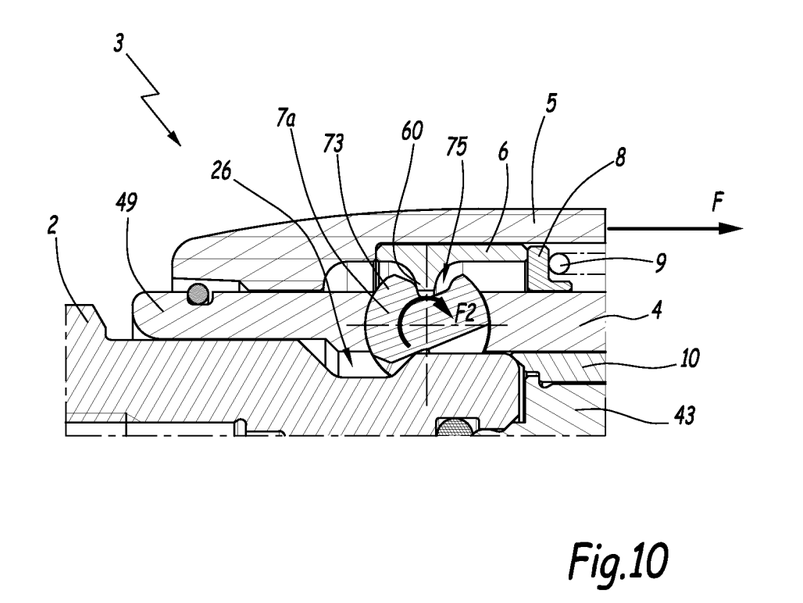
FIG. 10 is a view on a larger scale of the detail X in FIG. 4, in a first intermediate uncoupled configuration.

In order to uncouple the elements 2 and 3, an operator pulls on the maneuvering ring 5 opposite the outlet 49, as shown by the arrow F in FIG. 10, which drives the locking ring 6 opposite the outlet 49. The cylindrical surface S60 of the collar 60 slides against the blocking surface S73 of the shoulder 73 of the locking elements 7a and 7b and reaches the level of the groove 75, as shown in FIG. 10. The male element 2 is pushed back out of the female element 3 by the retaining force exerted by the springs 11 and 13 on the valve 43 and on the memory ring 10. The locking ring 6 releases the rotation of the locking elements 7a and 7b which are driven in rotation, around axes X40a-X'40a and X40b-X'40b, by the male element 2 in the second direction F2. The groove 26 of the male element 2 retracts with respect to the locking elements 7a and 7b, with the surface S266 of the groove 26 sliding on the locking surface S72 of the locking elements 7a and 7b.

Figure 11:
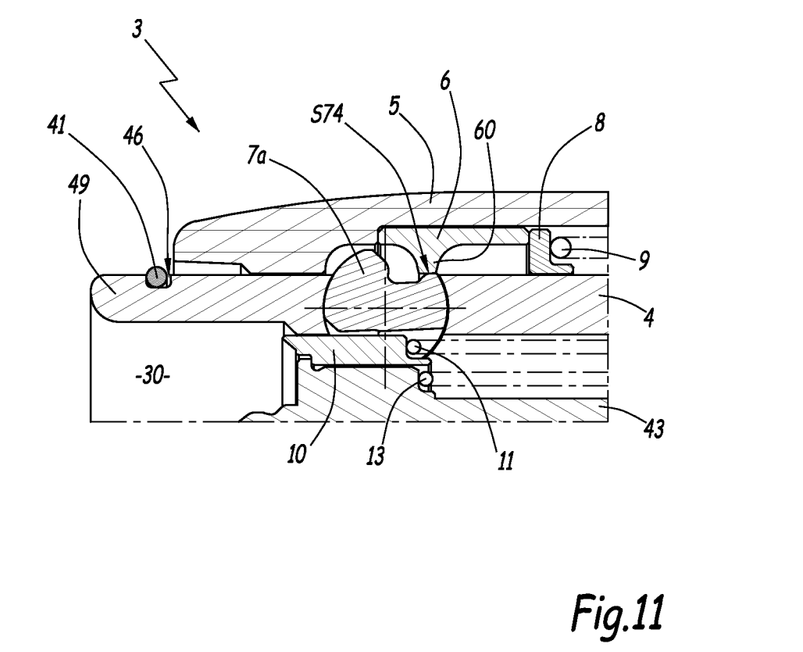
FIG. 11 is a view similar to FIG. 10 in a second intermediate uncoupled configuration.

The springs 11 and 13 continue to push back the male element 2 out of the female element 3, until the cylindrical surface S60 of the collar 60 comes into contact with the support surface S74 of the locking elements 7a and 7b, as shown in FIG. 11. As soon as the locking elements 7a and 7b no longer lock the male element, the valve 43 pushes back the male element 2 outside of the female element 3 until the valve 43 comes into contact against its seat 48, thus cutting off the channel 30.

The memory ring 10 is pushed back towards the outlet 49 by the spring 11 and is inserted between the valve 43 and the locking elements 7a and 7b in such a way as to maintain the locking elements 7a and 7b in an angular position, referred to as second position, shown in FIG. 3, which allows for the introduction of the male element 2 in the female element 3. The locking elements 7a and 7b are as such maintained in a possible withdrawal configuration of the male element 2, which makes it possible to guarantee the release of the male element 2 in the case where the spring 12 of the valve 43 is not strong enough.

If the memory ring 10 were absent, the retaining force exerted by the spring 9 would push back the locking ring 6 against the shoulders 73 of the locking elements 7a and 7b, which would cause the locking elements 7a and 7b to rotate in the direction F1, with the locking surfaces S72 then blocking the introduction of the male element 2 into the female element 3.

During the uncoupling manoeuvre, the locking ring 6 carries out a movement of translation along the axis X-X' of the coupling 1 during which it successively occupies three positions. In a first position (FIGS. 4, 5 and 7), the cylindrical surface S60 of the locking ring 6 constitutes an abutment in rotation of the locking elements in the direction F2. In a second position, the cylindrical surface S60 of the locking ring 6 has escaped from the blocking surface S73 of the locking elements 7a and 7b and penetrated into the groove 75 of the locking elements 7a and 7b which are the free to rotate. In a third position, the cylindrical surface S60 of the locking ring 6 is in contact with the support surface S74 of the locking elements 7a and 7b and constitutes an abutment in rotation of the locking elements in the direction F1.

The coupling 1 is automatic, it is sufficient to introduce the male element 2 into the female element 3 in order to carry out the uncoupling. It is not necessary to pull on the maneuvering ring 5.

The zones of contact between the mobile parts of the coupling 1 are relatively extended, which decreases the intensity of the contact pressures by distributing them over the surfaces. This is particularly advantageous in applications wherein the pressure of the fluid passing through the coupling is high. The coupling 1 as such has good robustness. In particular, the locking elements 7a and 7b are in surface contact with the body 4 of the female element 3, by the intermediary of the guiding surfaces S401 and S71. The locking elements 7a and 7b are in surface contact with the male element 2, by the intermediary of the truncated surfaces S266 and S72. The cylindrical surface S60 of the locking ring 6 is in surface contact with the blocking surfaces S73 of the locking elements 7a and 7b.

The radial dimension of the female element 3 is limited because the locking elements 7a and 7b rotate but are not displaced radially in order to pass from their locked position to their unlocked position and inversely.

The structure of the female element 3 is simple as the locking elements 7a and 7b are made of a single block. Furthermore, the holes 40a and 40b are obtained via simple machining, formed in the body 4. No additional part is inserted between the body 4 and the locking elements 7a and 7b, the body 4 directly forms the housing for receiving and guiding locking elements 7a and 7b in rotation.

Alternatively, the coupling 1 comprises a single locking element. According to the dimensions of the coupling, it is possible to have more than two locking elements, for example three or four locking elements. This makes it possible to better distribute the forces.

Alternatively, the maneuvering ring and the locking ring form a single part.

Alternatively, the axes X40a-X'40a and X40b-X'40b are generally orthoradial, i.e. they comprise an orthoradial component as well as an axial and/or radial component.

The invention claimed is:

1. A female element of a coupling for the disconnectable connection of two pipe lines of fluid under pressure, extending longitudinally along a longitudinal axis of the coupling and comprising:
   a body for receiving a male element and defining a channel for the passage of the fluid that extends along the longitudinal axis of the coupling,
   at least one locking element movable in rotation with respect to the body of the female element around a generally orthoradial axis which extends transversely relative to a radial direction with respect to the longitudinal axis of the coupling, between a first angular position wherein the at least one locking element locks the male element in a coupled configuration with the female element, and a second angular position wherein the at least one locking element permits the male element to be separated from the female element, wherein,
   the at least one locking element has a first guiding surface in the form of a portion of a cylinder with a circular section centered on a central longitudinal axis of the locking element,
   the at least one locking element is seated so as to selectively rotate in a slot of the body of the female element, the slot being open to the channel in the body of the female element and delimited by a cylinder with circular section extending along the orthoradial axis and defining a second guiding surface, in a form of a portion of a cylinder with a circular cross section and centered on the orthoradial axis, for guiding in rotation of the first guiding surface of the at least one locking element in the body of the female element around the orthoradial axis and the central longitudinal axis is superposed with the orthoradial axis and an end of the slot has an opening for introducing the at least one locking element into the slot, along the orthoradial axis, wherein the slot forms a housing for the locking element only.

2. The female element according to claim 1, wherein the first guiding surface of the at least one locking element extends over an entire length of the at least one locking element, measured according to the central axis of the at least one locking element coinciding with the orthoradial axis in mounted configuration of the at least one locking element in the slot.

3. The female element according to claim 1, wherein the at least one locking element has a locking surface in the form of a portion of a cone which is in contact with a peripheral groove of the male element in the coupled configuration.

4. The female element according to claim 1, wherein the female element includes a locking ring movable in translation along the longitudinal axis of the coupling, between a first position wherein the locking ring constitutes an abutment in rotation of the at least one locking element in the first angular position of the at least one locking element, and a second position wherein the locking ring permits rotation of the at least one locking element.

5. The female element according to claim 4, wherein the at least one locking element has a blocking surface which presses against the locking ring in the first angular position of the at least one locking element and which is a portion of a cylinder with a circular section extending along the longitudinal axis of the coupling.

6. The female element according to claim 4, wherein the at least one locking element has a blocking surface which presses against the locking ring in the first angular position of the at least one locking element and which is a portion of a cylinder with a circular section extending along the longitudinal axis of the coupling and wherein a locking surface and the blocking surface of the locking element are included in a casing in the form of a portion of the cylinder defined by the first guiding surface.

7. The female element according to claim 4, wherein the locking ring is mobile in translation along the longitudinal axis of the coupling, towards a third position wherein the locking ring constitutes an abutment in rotation of the locking element in the second angular position of the at least one locking element, and in that the at least one locking element has a support surface which is pressing against the locking ring in the second angular position of the at least one locking element.

8. The female element according to claim 7, wherein the support surface of the at least one locking element is included in a casing in the form of a portion of cylinder defined by the first guiding surface.

9. The female element according to claim 1, wherein the at least one locking element is of a single block.

10. The female element according to claim 1, wherein the slot of the at least one locking element is formed by machining the body.

11. The female element according to claim 1, including two diametrically opposite locking elements with respect to the longitudinal axis of the coupling.

12. The female element according to claim 1 including a plurality of locking elements.

13. The female element according to claim 1, wherein the end of the slot communicates with a cut-out for inserting the locking element in the slot by causing the locking element to slide in the slot along the orthoradial axis.

14. The female element according to claim 13, wherein the cut-out is parallel to the longitudinal axis of the coupling.

15. A coupling for the disconnectable connection of two pipe lines of fluid under pressure, wherein the coupling comprises a male element and a female element according to claim 1.

16. The coupling according to claim 15 including a plurality of locking elements.

* * * * *